F. NEWLIN.
COUPLING.
APPLICATION FILED JUNE 26, 1912.
1,070,165.
Patented Aug. 12, 1913.
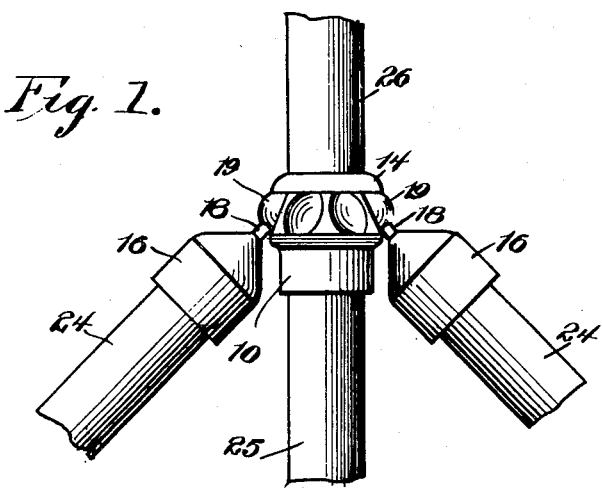
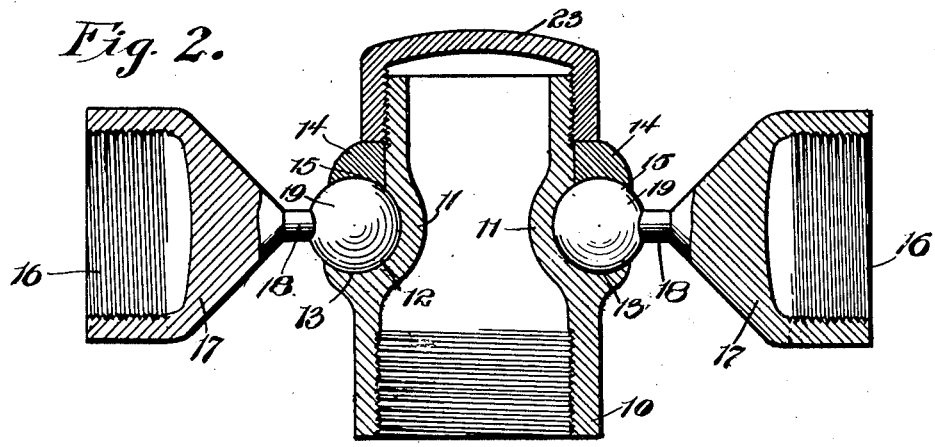
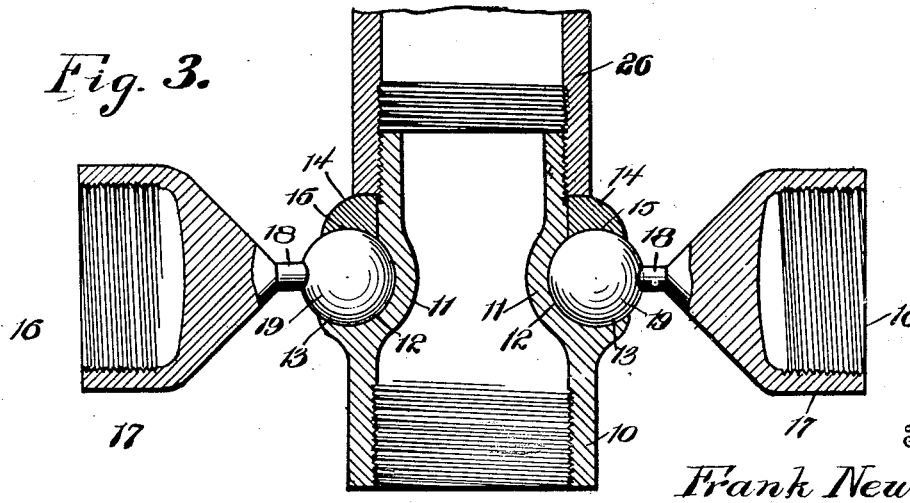
Witnesses
Wm. H. Mulligan.
Inventor
Frank Newlin,
By Victor J. Evans
Attorney

UNITED STATES PATENT OFFICE.

FRANK NEWLIN, OF FREMONT, MICHIGAN.

COUPLING.

1,070,165.

Specification of Letters Patent.  Patented Aug. 12, 1913.

Application filed June 26, 1912. Serial No. 706,105.

*To all whom it may concern:*

Be it known that I, FRANK NEWLIN, a citizen of the United States, residing at Fremont, in the county of Newaygo and State of Michigan, have invented new and useful Improvements in Couplings, of which the following is a specification.

An object of the invention is to provide a coupling particularly adaptable for use in connecting rail sections to form railings.

The invention embodies, among other features, a coupling having movable parts whereby the ends of rail sections can be connected to the coupling at various angles, thus providing a coupling that can be adapted to perform the functions of a T member, a Y, L or cross member.

In the further disclosure of the invention reference is to be had to the accompanying drawings constituting a part of this specification in which similar characters of reference denote corresponding parts in all the views, and in which:

Figure 1 is a side elevation of my device showing a manner of employing the same in connection with a railing; Fig. 2 is an enlarged vertical sectional view of the coupling showing the interior construction of the coupling a cap being shown in place of the vertical continuation of the lower upright, as disclosed in Fig. 1. Fig. 3 is a vertical sectional view of the coupling showing the interior construction of the coupling when the same is used as shown in Fig. 1.

Referring more particularly to the views, I employ a tubular body 10, preferably cast in a single piece, the said body being interiorly threaded at the lower end thereof and exteriorly threaded at the upper end thereof, a bulge 11 being formed on the body 10, between the upper and lower threaded portions thereof, to form a recess 12 constituting a ball and socket joint 13, a collar 14 being provided for engagement with the upper end of the body 10 and having the face 15 thereof slightly curved to form a continuation of the ball and socket joint 13.

Coupling members 16 are mounted to swing freely on the body 10, the said coupling members each constituting a tubular head 17 provided with an integral shank 18 terminating in a ball 19, the ball 19 being adapted to repose within the ball and socket joint 13, the face 20 of the ball and socket joint being provided with circular grooves forming seats 21, the balls 19 formed on the shanks 18 of the tubular heads 17 being adapted to repose in the said seats, the face 15 of the collar 14 being also provided with grooves forming seats 22 adapted to receive the upper portions of the balls 19.

As shown in Fig. 2 a cap 23 is provided for threaded connection with the upper end of the body 10 to close the upper end thereof, the said cap being provided to present a neat and effective appearance and also adapted to engage the collar 14 and retain the same in proper position on the body 10.

In assembling the structure the balls 19 formed on the shanks 18 of the tubular heads 17 are first mounted to repose upon the seats 21 formed in the face 20 of the ball and socket joint 13 and the collar 14, is then mounted on to the upper end of the tubular body 10 so that the curved face 15 of the collar forms a continuation of the ball and socket joint 13, the upper portions of the balls 19, reposing upon the seats 21, being adapted to extend into the grooves forming the seats 22 on the face 15 of the collar 14, after which the cap 23 is threaded on to the upper end of the tubular body 10 with the lower end of the cap engaging the upper outer face of the collar 14, thus retaining the collar in position to properly support the balls 19 within the ball and socket joint 13, it being readily seen that the balls can be freely moved when positioned as mentioned so that rail sections 24 can be conveniently connected to the coupling members 16 and arranged at any desired angle, the coupling heads being threaded on the inner peripheries thereof to receive and securely hold the rail sections 24 relatively to the tubular body 10. It will be further seen by referring to Fig. 1 that a post or upright 25 can be threaded to the lower end of the tubular body 10, the said body being threaded on the inner periphery thereof to accommodate the post, as mentioned heretofore.

If it is desired to continue the upright 25 above the coupling described, the cap 23 is dispensed with and a second post or upright 26 is threaded on the upper end of the body 10, with the lower end of the post or upright 26 engaging the collar 14 in the same manner that the cap 23 engages the collar in Fig. 2, to retain the collar in proper position relatively to the ball and socket joint 13.

It will be readily understood that various departures can be made from the constructions disclosed in order to accommodate sections of various sizes and shapes and that one or a plurality of rail sections 24 can be connected to the coupling members 16, it being understood that one coupling member is provided for each rail section, as shown.

Having thus described my invention, I claim:

In a coupling, the combination with a tubular body interiorly threaded on the lower end thereof and exteriorly threaded on the upper end thereof, of semi-spherical seats formed in a face of the said body, balls loosely reposing on the said seats, shanks formed integrally with the said balls, tubular heads formed with the said shanks, a collar loosely encircling the said tubular body and provided on the under face with indentations in which the upper portions of the said balls are received, and a tubular member for threaded connection with the said tubular body and adapted to engage the said collar to retain the collar in position on the body, the said tubular member being revoluble and movable vertically on the tubular body for loosening or tightening the said collar relatively to the said balls.

In testimony whereof I affix my signature in presence of two witnesses.

FRANK NEWLIN.

Witnesses:
JENNIE SCHEPERS,
EVA JOHNSON.